(12) United States Patent
Kung

(10) Patent No.: US 6,976,666 B1
(45) Date of Patent: Dec. 20, 2005

(54) ELECTROMAGNETIC VALVE ASSEMBLY FOR CONTROLLING AIRBAG

(75) Inventor: Pi-Fu Kung, Taipei (TW)

(73) Assignee: Many A Enterprise Co., Ltd., Taipei (TW)

( * ) Notice: Subject to any disclaimer, the term of this patent is extended or adjusted under 35 U.S.C. 154(b) by 8 days.

(21) Appl. No.: 10/847,572

(22) Filed: May 18, 2004

(51) Int. Cl.[7] ............................................. F16K 31/00
(52) U.S. Cl. .................. 251/129.09; 251/367; 137/223
(58) Field of Search .................................. 251/129.09

(56) References Cited

U.S. PATENT DOCUMENTS

| | | | | |
|---|---|---|---|---|
| 4,570,676 | A | * | 2/1986 | Nishio et al. ................ 137/870 |
| 4,890,344 | A | * | 1/1990 | Walker ........................... 5/713 |
| 5,234,196 | A | * | 8/1993 | Harris .......................... 251/328 |
| 5,277,693 | A | * | 1/1994 | McCollor et al. .............. 600/19 |
| 5,570,716 | A | * | 11/1996 | Kamen et al. ................ 137/343 |
| 5,906,218 | A | * | 5/1999 | Carey .......................... 137/82 |
| 6,202,672 | B1 | * | 3/2001 | Ellis et al. ................... 137/223 |
| 6,202,674 | B1 | * | 3/2001 | Wingett ....................... 137/343 |
| 6,793,199 | B2 | * | 9/2004 | Bushik et al. ............... 251/367 |
| 2004/0084649 | A1 | * | 5/2004 | Yoshimura et al. ..... 251/129.15 |
| 2004/0222397 | A1 | * | 11/2004 | Hayashi ................. 251/129.09 |

* cited by examiner

Primary Examiner—J. Casimer Jacyna

(57) ABSTRACT

An electromagnetic valve assembly for controlling airbags, includes a single valve assembly joined by main valve bodies of two electromagnetic valves each having respective electromagnetic control coils. A ventilation opening of the joined single valve assembly is placed with a film further mounted with a ring-shaped loop; an upper cover of the valve is connected with an electromagnetic tube accommodated with a spring and an electromagnetic; a rhombus flange is utilized to press against a washer and the ring-shaped loop. The electromagnetic is placed with a coil thereon and a planar washer; a ventilation opening at a side of the valve cover is placed with a ring-shaped loop to keep being airtight with the main valve body by using a screw; and the main valve is provided with a stopper at a side thereof, and an L-shaped plate being capable of adjusting installed positions.

1 Claim, 7 Drawing Sheets

ELECTROMAGNETIC VALVE ASSEMBLY FOR CONTROLLING AIRBAG

BACKGROUND OF THE INVENTION (a) Field of the Invention

The invention relates to an electromagnetic valve assembly for controlling airbags, and more particularly, to an electromagnetic valve assembly for controlling airbags of an automobile. The electromagnetic valve assembly according to the present invention simplifies four independent main electromagnetic valves used for controlling inflation and deflation of two airbags of prior inventions, into one main electromagnetic valve assembly capable of simultaneous inflation and deflation, thereby significantly reducing production costs and storage spaces.

(b) Description of the Prior Art

Referring to FIG. 1, current automobile airbags 23 are generally chemical-gas-sensed air bags, which can be replaced by compresses gases when a valve assembly according to the invention is implemented. According to the prior invention, deflation of airbags at two sides of a driver's seat and a front passenger's seat are initiated or ceased by an electromagnetic valve 22. Each airbag requires two electromagnetic valves for deflation and inflation, meaning that four electromagnetic valves are required for two airbags. Thus, not only production costs are multiplied, but large storage spaces are also occupied. In addition, the more apparatuses there are, the higher the chances of malfunctions. It remains a doubtful question that whether all the multiple electromagnetic valves, at times of car accidents, are capable of simultaneous operations for reliably attending to users' safety. It is a vital task of the invention as how to overcome the aforesaid drawbacks.

Furthermore, airbags of automobile shock absorbers and air braking systems regarding safety, production costs and storage spaces, are also part of considerations taken into the present invention.

SUMMARY OF THE INVENTION

The primary object of the invention is to provide an electromagnetic valve having a simplified structure for simultaneously performing inflation or deflation of airbags.

According to the invention, a main valve assembly is formed by joining two main valve bodies of two electromagnetic valves. Inlets and outlets of two valves are located next to each other and are joined using one transverse strip. A ventilation opening of the inlet valve is provided with an orifice in communication with the atmosphere, and is blocked using a stopper, such that, without discharging air to restore an original status, air released after activation of an inlet valve can be supplied to the other airbag when the valves is controlling the airbag. In addition, air from the two airbags can be passed through the orifice for simultaneous air discharge to restore to an original status.

The invention can be applied to:
1. automobile airbags having a greatest advantage of using free and clean air instead of hazardous chemical gases: environmental concerns are eliminated and can be repeated used by common users but not professional staff, thereby economizing time and money required;
2. operations and controls of air pads and airbags for assisting shock absorbing of automobiles: systems can be inflated in order to lift shock absorbers of automobiles when driving on lumpy grounds, so as to prevent direct impacts of automobile chassis with the grounds; in addition, heights of automobile chassis can be dropped through deflation when automobiles are parked to provide anti-theft effects;
3. loop controls of air-pressurized braking systems of large automobiles: the invention is capable of reinforcing braking time and strength.

DETAILED DESCRIPTION OF THE PREFERRED EMBODIMENTS

Figure 1:
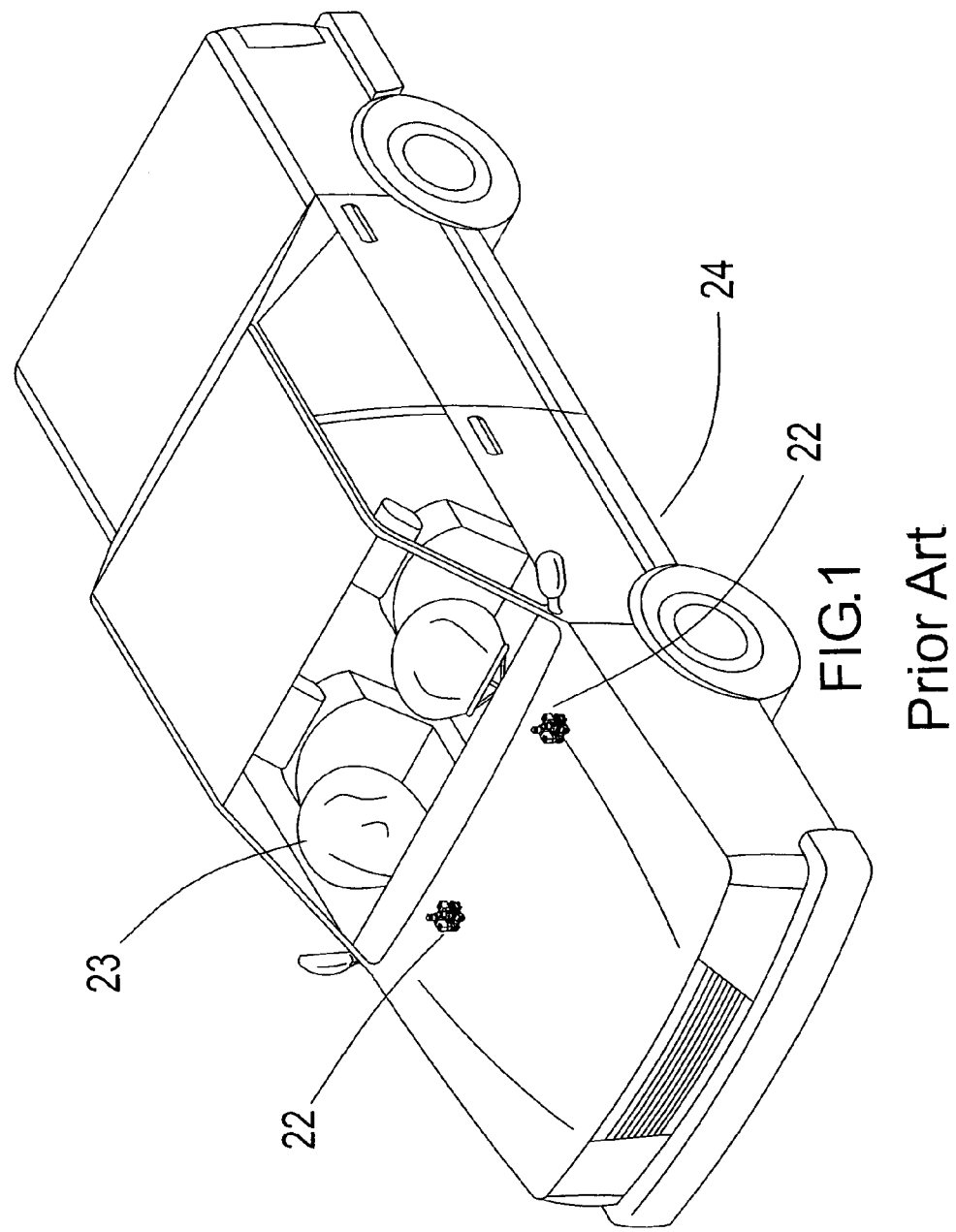
FIG. 1 shows a schematic view illustrating positions of prior inflation valves being installed.
Figure 2:
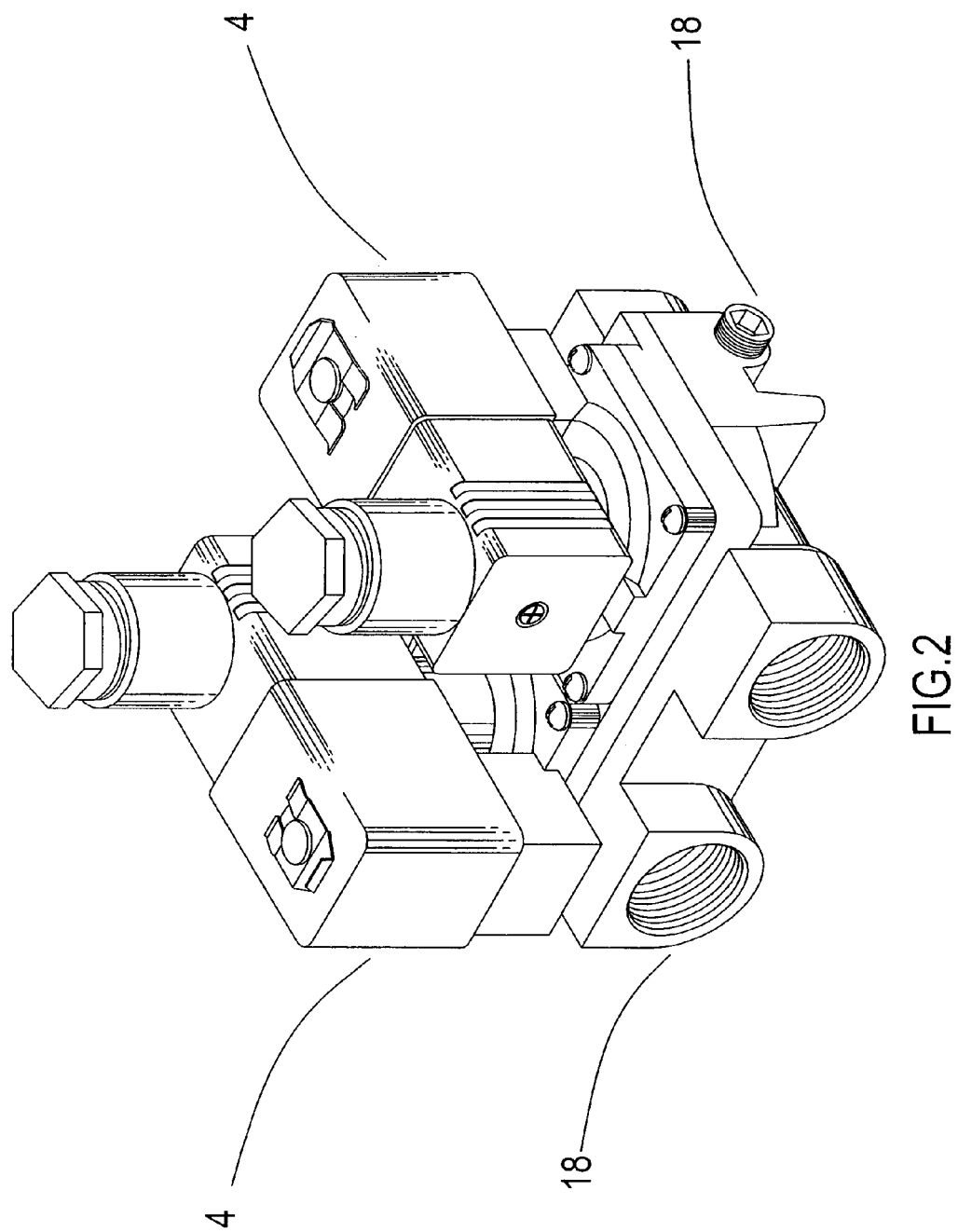
FIG. 2 shows an elevational schematic view according to the invention.
Figure 3:
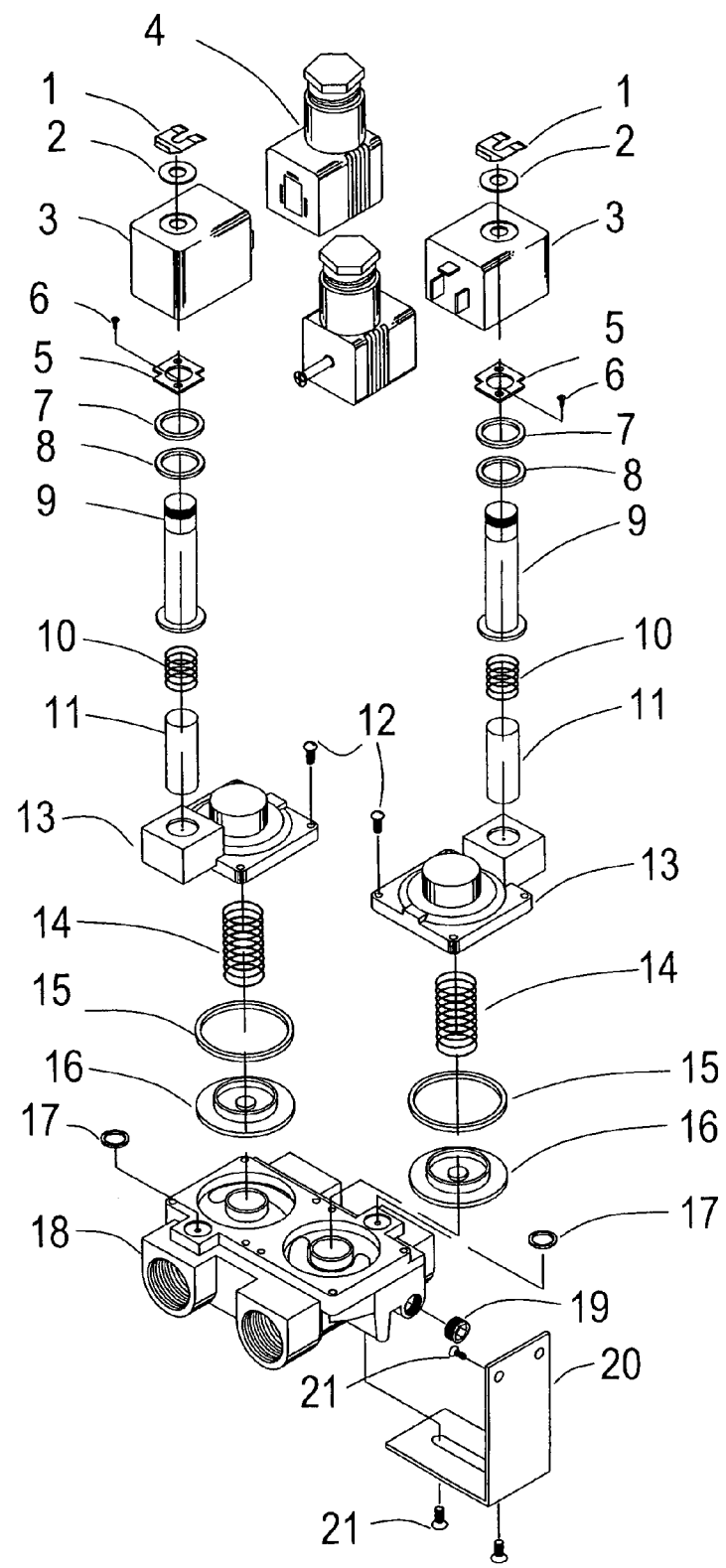
FIG. 3 shows an exploded schematic view according to the invention.
Figure 4:
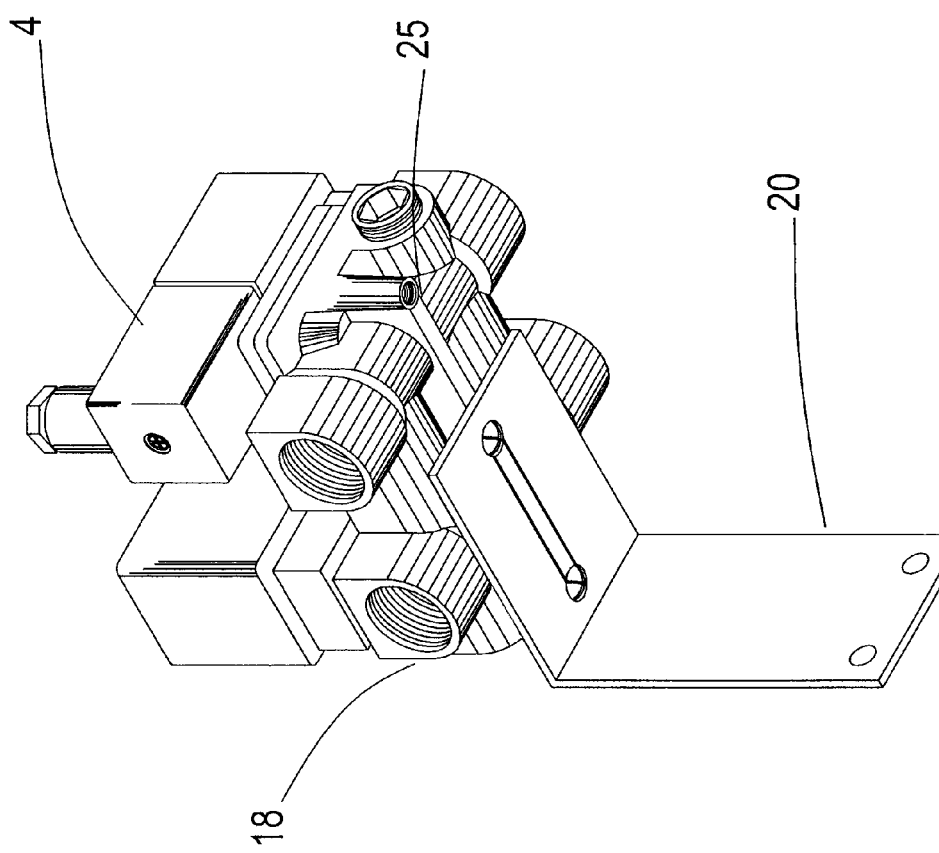
FIG. 4 shows another elevational schematic view according to the invention.

Referring to FIGS. 2 and 3, the invention comprises a main valve assembly 18 and a switch box 4.

An assembled valve is mounted with a film 16 further having a ring-shape loop 15. A side of a valve cover is connected with an electromagnetic tube 9 accommodated with a spring 11 and an electromagnet 11. A rhombus flanged 5 is utilized for pressing against a washer 7 and a ring-shaped loop 5, and are altogether fastened at a side of a valve cover using a screw 6. The electromagnetic tube 9 is placed on a coil 3, levelly covered with a washer 2 and fastened with pressed anti-sliding plate 1. The outlet at the side of the valve cover is accommodated with a ring-shaped 17 to keep being airtight with the main valve body, and is closed joined with the main valve body using a screw 12. The main valve assembly 18 is disposed with a stopper 19 at a side thereof, and a screw fastening opening 25 at a lower portion thereof for placing an L-shaped plate 20 as desired, wherein the L-shaped plate 20 is fixed using a screw 20.

Figure 5:
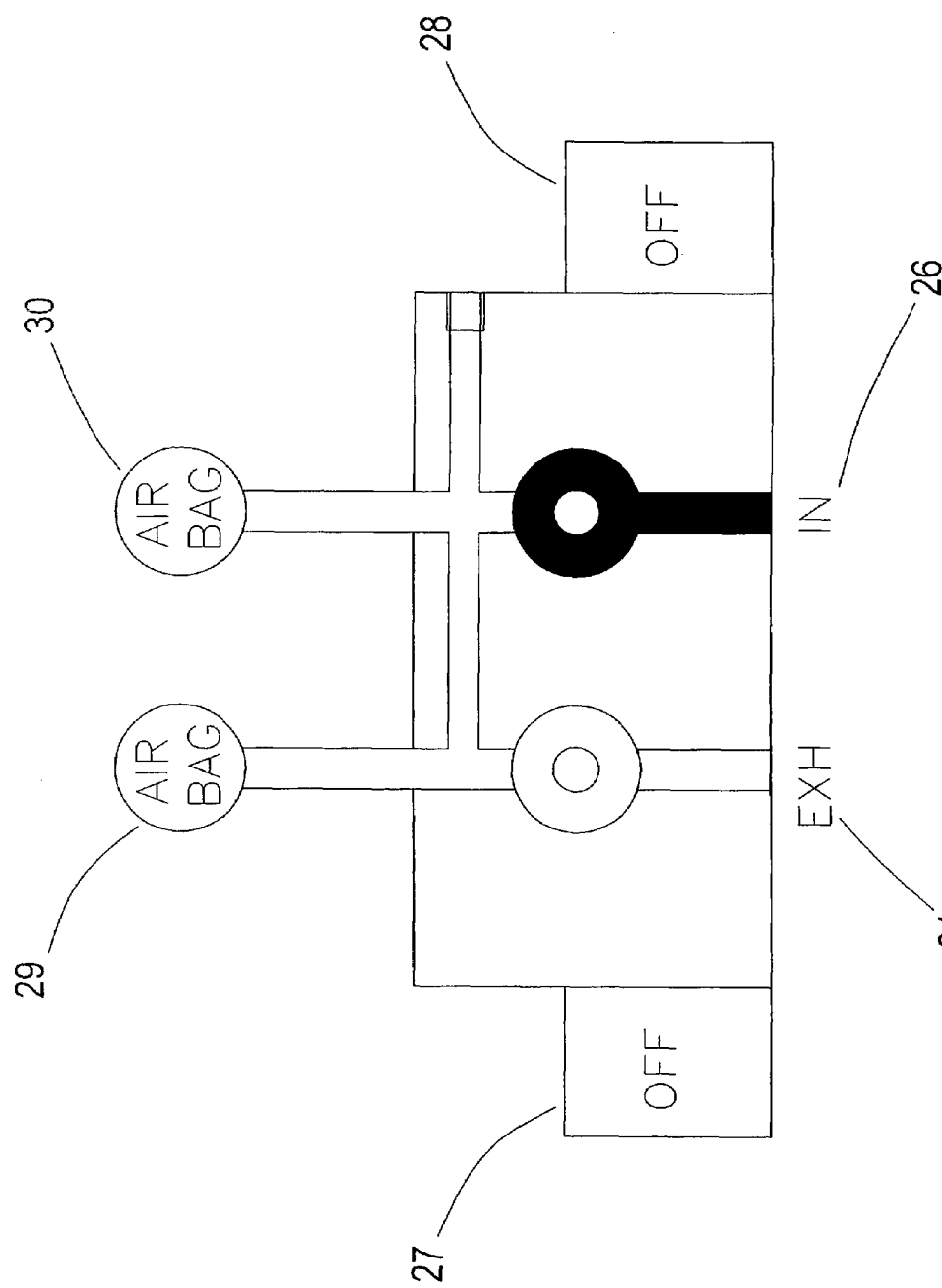
FIG. 5 shows a schematic view illustrating air pipes in a shut status the invention.

Referring to FIG. 5 showing an electromagnetic valve assembly for controlling airbags in an embodiment according to the invention, when valve elements are at a shut status, joints 27 and 28 at two sides of the valve elements are at an off state. At this point, air gates 26 and 31 are closed and therefore airbags 29 and 30 remain not inflated. Such state is as when the airbags are not inflated under normal driving circumstances.

Figure 6:
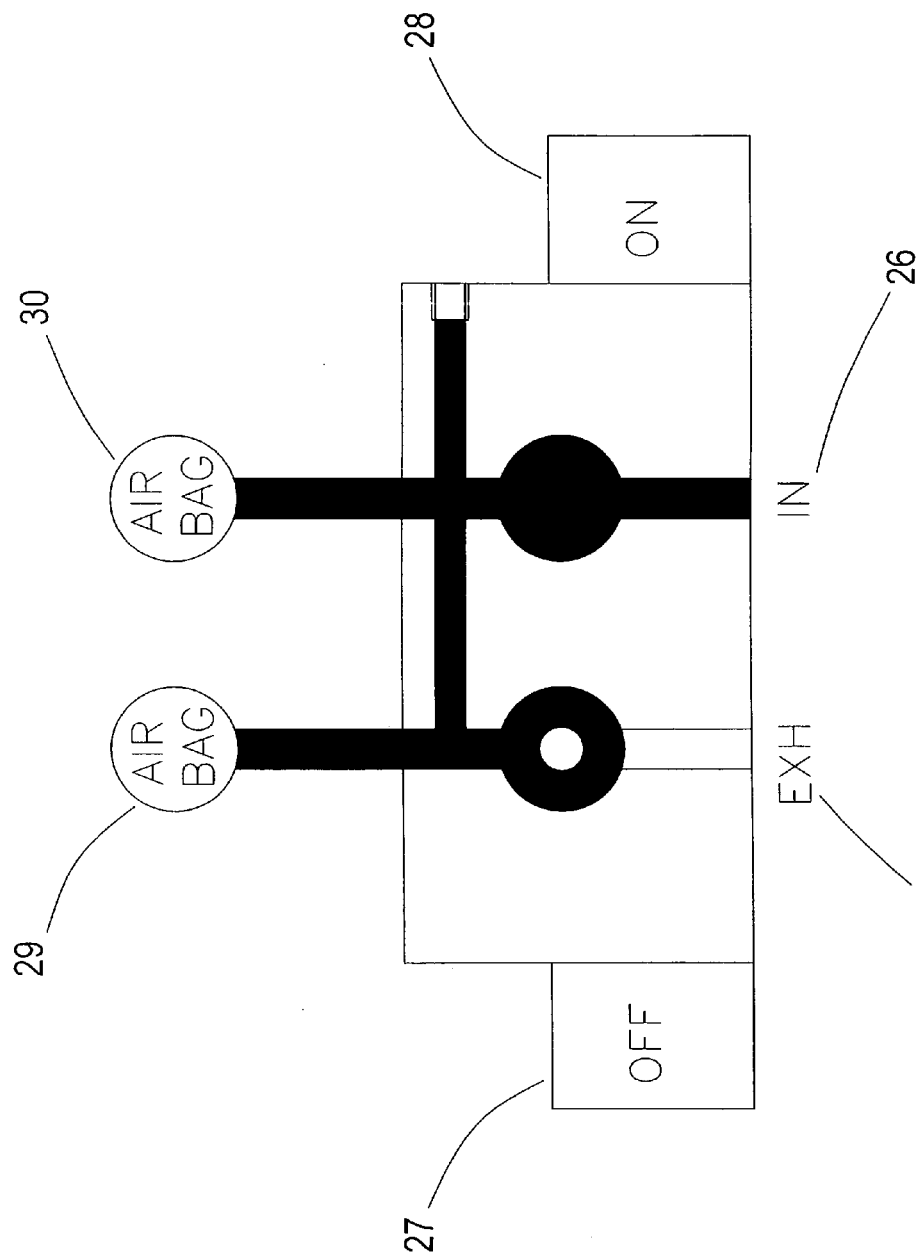
FIG. 6 shows a schematic view illustrating air pipes used for inflation according to the invention.

Referring to FIG. 6, when the joint 28 is excited, the air gate 26 becomes open to supply air. Air is directly entered into the airbags 29 and 30 to protect safety of a user. Such state occurs when a driver encounters an accident or an automobile body is collided by other objects. Internal valve elements are magnetically excited to have air inflating the airbags, thereby protecting the user.

Figure 7:
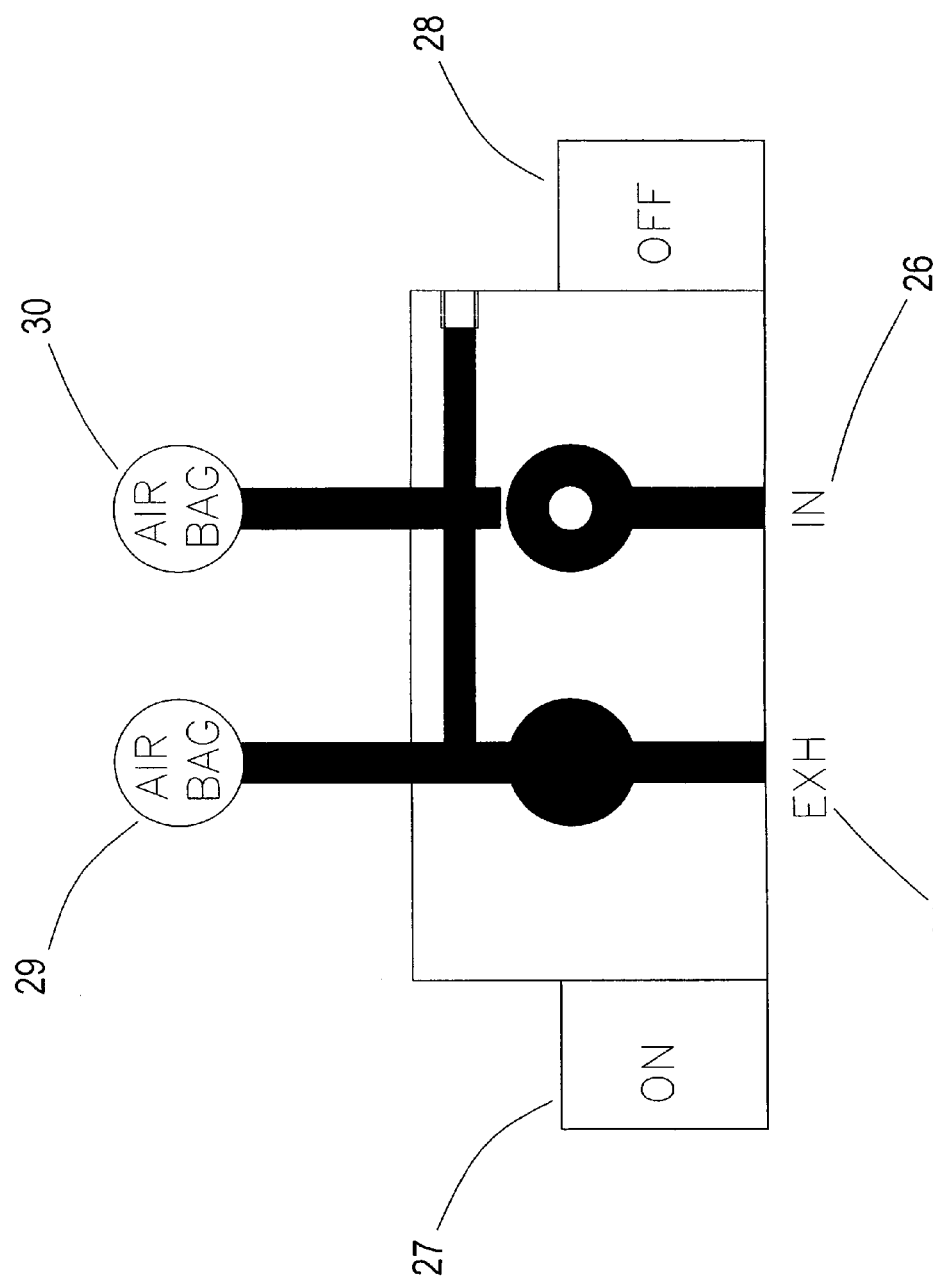
FIG. 7 shows a schematic view illustrating air pipes used for deflation according to the invention.

Referring to FIG. 7, to discharge the air in the airbags, the joint 27 is magnetically excited to open up the air gate 31 that then allows the air discharge. That is, when the inflated airbags need to be deflated to restore an original state, the other joint of the valve elements can be opened to discharge the air.

To distinguish the advancement and practicability of the invention, the invention is compared and analyzed with the prior inventions.

The prior inventions have drawbacks of:
1. more probably malfunctions as a number of electromagnetic valves gets larger;
2. a plurality of inflation valves disposed failing to quickly and reliably inflate at a simultaneous manner in time of a car accident;
3. a user's life not being fully protected;
4. re-inflation by professional staff and chemical gases needed after deflating airbags inflated by unintentional contacts;
5. unsatisfactory safety measures;
6. lack of novelty; and
7. high production costs and large storage spaces.

The invention has excellences of:
1. capable of simultaneously controlling operations of two airbags to lower probable malfunctions from excessive equipments;
2. providing decreased number of parts in an automobile to reduce space needed and to substantially cutting out production costs;
3. automatic inflation capability using an air storage tank after deflating the airbags inflated by unintentional contacts; and
4. having practicability using a simplified structure.

It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. An electromagnetic valve for controlling airbags, comprising a single valve body joined by main valve bodies of two electromagnetic valves each having respective electromagnetic control coils; and being characterized that:
   a ventilation opening of the joined single valve body is placed with a film further mounted with a ring-shaped loop; an upper cover of the valve is connected with an electromagnetic tube accommodated with a spring and an electromagnetic; a rhombus flange is utilized to press against a washer and the ring-shaped loop, with a screw locating a side of the valve cover; the electromagnetic is placed with a coil thereon and a planar washer and then pressed with an anti-sliding plate; a ventilation opening at a side of the valve cover is placed with a ring-shaped loop to keep being airtight with the main valve body, and the ring-shaped loop is closely joined with the main valve body using a screw; and the main valve is provided with a stopper at a side thereof, and an L-shaped plate having a screw opening, and being capable of adjusting installed positions at a lower portion thereof and fastened by a screw.

* * * * *